(No Model.)

R. N. ROCKWELL.
ELECTRIC CHAIN BATTERY.

No. 345,178. Patented July 6, 1886.

WITNESSES
F. L. Ouvand
Edward Stanton

Robert N. Rockwell,
INVENTOR
By Louis Bagger & Co.
Attorneys

UNITED STATES PATENT OFFICE.

ROBERT N. ROCKWELL, OF PEABODY, KANSAS.

ELECTRIC CHAIN BATTERY.

SPECIFICATION forming part of Letters Patent No. 345,178, dated July 6, 1886.

Application filed January 23, 1886. Serial No. 189,479. (No model.)

*To all whom it may concern:*

Be it known that I, ROBERT N. ROCKWELL, a citizen of the United States, and a resident of Peabody, in the county of Marion and State of Kansas, have invented certain new and useful Improvements in Electric Chain Batteries; and I do hereby declare that the following is a full, clear, and exact description of the invention, which will enable others skilled in the art to which it appertains to make and use the same, reference being had to the accompanying drawings, which form a part of this specification, and in which—

Figure 1:
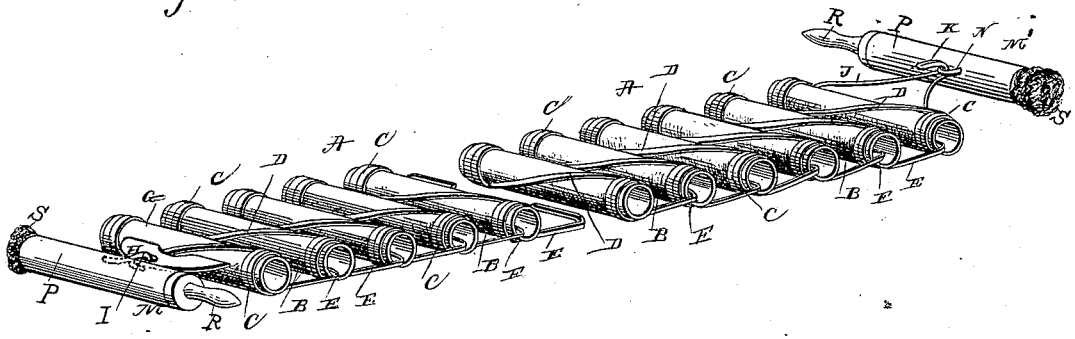
Figure 2:
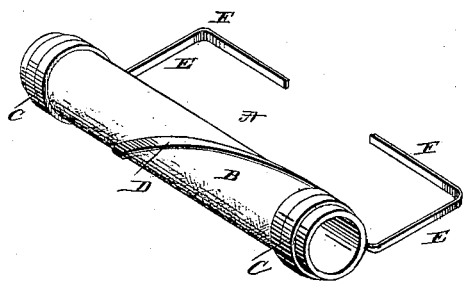
Figure 3:
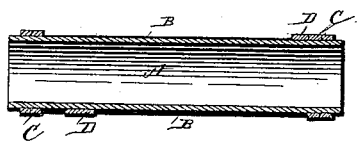

Figure 1 is perspective view of my improved electric chain battery with one half separated from the other and inverted. Fig. 2 is a perspective view of one of the links of the same, and Fig. 3 is a longitudinal sectional view of a link.

Similar letters of reference indicate corresponding parts in all the figures.

My invention has relation to that class of electric batteries which are employed for the purpose of applying an electric current to various portions of the body for healing purposes, and which are portable, so that they may be applied and may remain applied for some length of time without interfering with the movements of the patient; and it consists to that end in the improved construction and combination of parts of the same, as hereinafter more fully described and claimed.

In the accompanying drawings, the letters A indicate a number of cylinders of zinc, which are hollow and wrapped upon their outer sides with a covering, B, of some textile material which may absorb and retain a fluid. A piece of copper wire or band is wrapped around the ends of each cylinder, forming coils C C at its ends, and having a portion, D, wrapped once around the cylinder and connecting the coils, and the ends E of the wire are bent out from the cylinder, and thereupon bent inward to form hooks F F, which may be inserted into the ends of another cylinder, the inwardly-bent ends pointing toward each other. A number of these cylinders with the ends of their wires inserted into the ends of one another form a chain, and the ends of the chain are formed at one end by a zinc cylinder, G, having a perforated lip or flange, H, projecting from its side, into the perforation of which lip a wire hook, I, on a handle, M, is inserted, while the other end of the chain is formed by a double piece, J, of copper wire, which has its ends secured to the end coils of the last cylinder, and which has its doubled end bent to form a hook, K, for insertion into staple N on a handle, M.

The handles or electrodes M M', are each constructed of a body portion, P, of some metal of low resistance, as copper, having a sponge, S, attached at one end and an insulating-tip, R, at the other end.

The battery is dipped before using it in an acid solution, which will cause an electric current to be created in the chain, the strength of which depends upon the number of links and upon the size of the same, and it will be seen that the links may so easily be inserted or removed in the chain that a chain may be produced of any desired strength when the person using it is provided with a number of extra links, the links being disengaged by opening the hooked ends of the wires or bands, withdrawing them from the cylinders, while they are secured in the chain by inserting the hooked ends of one link into the open ends of the adjoining cylinder. It will be seen that this chain may be produced at a very slight expense, and may be manufactured with very simple means, and the wire or band coils at the ends of the cylinders and the central open coil will serve to secure the fabric upon the cylinders. The central open coil will also serve to connect and hold in position the two coils at the ends of each cylinder, preventing them from slipping off from the ends of the cylinders.

Any break in the chain may be easily discovered, as all the wire coils are upon the outside of the links, so that if the chain should fail to produce a current the links may be easily examined, and a link having a break in its wire or cylinder may easily be removed and another inserted.

The cylinders and coils may be made, respectively, of any of the materials used in forming well-known "couples."

I am aware that electric chain batteries have been constructed of links comprising vertical cylinders with an absorbent material and a coiled wire on the inside thereof, the ends of said wires projecting beyond the cylinders and formed into hooks, and I do not claim such construction, broadly; but

I claim and desire to secure by Letters Patent of the United States—

1. In an electric chain battery, the combination of a hollow cylinder of suitable material, an encircling covering of absorbent material, and a wire or band coiled around and upon the absorbent covering near the ends of the cylinder, the ends of the wire bending out from the cylinder and then toward each other, substantially as described and set forth.

2. In an electric chain battery, the combination of a cylinder of suitable metal, an absorbent outer covering for the same, and a wire or band formed into coils around and upon the absorbent covering near the ends of the cylinder and into an open coil at its middle, and having the ends bent out from the cylinder and thereupon bent toward each other, forming hooks, as and for the purpose shown and set forth.

3. In an electric chain battery, the combination of a series of links consisting of metal cylinders having an outer covering of absorbent, and having a wire or band coiled around their ends connected at the middles by an open coil or loop, and having the ends bent to form inwardly-pointing hooks, a link having a double wire or band secured with its ends to the coils at the ends of the cylinder and bent to form a hook at its double end, a link provided with a flange or tongue at its side, and electrodes attached at either end of said series of links, substantially as and for the purpose described and set forth.

In testimony that I claim the foregoing as my own I have hereunto affixed my signature in presence of two witnesses.

ROBERT N. ROCKWELL.

Witnesses:
AUGUST HOMANN,
LOUIS M. KNOWLES.